United States Patent

[11] 3,609,055

[72] Inventors Andrew C. Luff
2025 Chevy Chase Blvd.;
John E. Barnett, 747 Keenway Circle, both of Kalamazoo, Mich. 49001
[21] Appl. No. 806,251
[22] Filed Mar. 11, 1969
[45] Patented Sept. 28, 1971

[54] DRILL PRESS
11 Claims, 3 Drawing Figs.
[52] U.S. Cl. .................................................. 408/135, 408/234
[51] Int. Cl. ........................................... B23b 39/00, B23b 47/00
[50] Field of Search .......................................... 77/5, 32, 33.7, 34.2, 34.6, 19, 20, 27, 28

[56] References Cited
UNITED STATES PATENTS
506,865 10/1893 Stover et al. ................... 77/34.6 X
1,465,721 8/1923 Purves ........................... 77/5

Primary Examiner—Francis S. Husar
Attorney—Price, Heneveld, Huizenga & Cooper

ABSTRACT: This disclosure relates to a drill press having a quill assembly, a drive shaft, and a support column fixed to a central lightweight cast housing through flanged collars. The top and bottom surfaces of the central housing are machined flat and parallel. The flange collar surfaces in contact with the top and bottom of the central housing are also machined flat and at right angles to the bore to mate with the machine surfaces of the case housing to thereby ensure precise alignment of the quill assembly, drive shaft and support column within the cast housing, and to provide an inexpensive way of replacing worn parts.

The quill assembly has a longitudinal vertical bore in which the quill slides. A pressure screw abuts the quill to lock the same in any desired position.

A positive drive is provided to the drive shaft by the use of a gear belt which is connected to a power source through a variable drive mechanism.

DRILL PRESS

This invention relates to a drill press. In one of its aspects it relates to a drill press having a quill assembly fixed to a cast housing through a flange on the quill assembly, the flange having a machined flat surface abutting a machined flat surface on the housing.

In another of its aspects the invention relates to a drill press having a cast central housing supported on a central column which extends through the casting by means of flanged collars having machined flat surfaces which abut flat machined surfaces of the central housing to ensure proper alignment of the housing with relation to the central column.

In another of its aspects the invention relates to a drill press having a quill assembly with a quill within a longitudinal bore in a quill housing wherein proper alignment of the quill within the quill housing is maintained by large contact areas between the two members.

In present drill presses, a central housing is supported by a support column. The central housing is machined to receive the support column and to receive a quill housing. After extensive use of the drill press, the surfaces in contact wear, causing misalignment of the parts. This misalignment can only be corrected by casting a new housing and performing new machining operations.

Bushings have been used on cast housings between the movable parts. The bushings vary from part to part and do not provide positive methods of aligning parts when the bushings have been replaced.

The quill assemblies conventionally employed comprise a hollow cast housing with multiple bearing lands with a quill in the housing held in position by a split collar. The wear resulting from moving contact between the quill and the housing is uneven causing misalignment of the quill assembly.

By various aspects of this invention one or more of the following, or other, objects can be obtained.

It is an object of this invention to provide an improved drill press wherein replacement of parts due to wearing between the central housing and the support column can be made inexpensively and effectively.

It is a further object of this invention to provide an improved drill press wherein replacement of parts due to wearing between the quill housing and the central housing can be made inexpensively and effectively.

It is a further object of this invention to provide an improved drill press which is inexpensive to construct, more durable in use, and inexpensive to maintain.

A further object of this invention is to provide an improved drill press in which various types, sizes, and kinds of quills can be utilized with minimum difficulty.

It is yet another object of this invention to provide an improved drill press with an improved quill assembly wherein wear takes place evenly and misalignment of the quill within the quill housing is prevented.

It is yet another object of this invention to provide an improved drill press wherein there is a positive nonslip drive between the variable drive and a drive shaft for the bit.

It is yet another object of this invention to provide an improved drill press wherein proper alignment between the support column, the drill housing, the quill, and the drive shaft are ensured even when worn parts are replaced.

Other aspects, objects, and the several advantages of this invention are apparent to one skilled in the art from a study of this disclosure, the drawings and the appended claims.

According to the invention there is provided a drill press having a main housing with a top wall, a bottom wall, and sidewalls. A support column supports the main housing. A quill assembly is supported by the main housing. A drive shaft is rotatably supported by the quill for rotation about its longitudinal axis. The shaft is adapted to engage a chuck at the bottom portion thereof. Means are provided on the main housing for supplying rotative power to the drive shaft and the quill assembly has means for imparting longitudinal reciprocation to the drive shaft. The main housing has openings through which the support column extends and in which the quill assembly is positioned.

According to one embodiment of the invention, the quill assembly has a flange through which it is fixed to the main housing. The flange has an upper machined flat and preferably horizontal surface which contacts a machined flat and preferably horizontal surface on the bottom of the central housing to assure precise alignment between the central housing and the quill.

Further, the drive shaft is supported at its upper end by the central housing through a flanged collar. The flanged collar has an outwardly extending flange with a machined flat and preferably horizontal lower surface which contacts a machined flat and preferably horizontal upper surface of the central housing to ensure proper alignment of the drive shaft within the quill housing and with respect to the central housing.

In another embodiment, the support column extends through a pair of flanged collars which are fixed to the central housing. A bottom flanged collar has an outwardly extending flange with an upper flat machined and preferably horizontal surface in contact with a lower flat machined and preferably horizontal surface on the bottom of the central housing. An upper flanged collar contains an outwardly extending flange having a lower flat machined and preferably horizontal surface which abuts against an upper flat machined and preferably horizontal surface on the central housing.

In sill another embodiment of the invention, the quill assembly has an outer casting with a longitudinal vertical bore. A quill is supported for reciprocatory motion within the vertical bore. A lateral bore in the quill housing communicates with the vertical bore and contains an adjustable pressure screw which is adapted to lock the quill in a desired position. A rack and pinion actuates movement of the quill within the vertical bore.

The invention will now be described with reference to the accompanying drawings in which.

Figure 1:
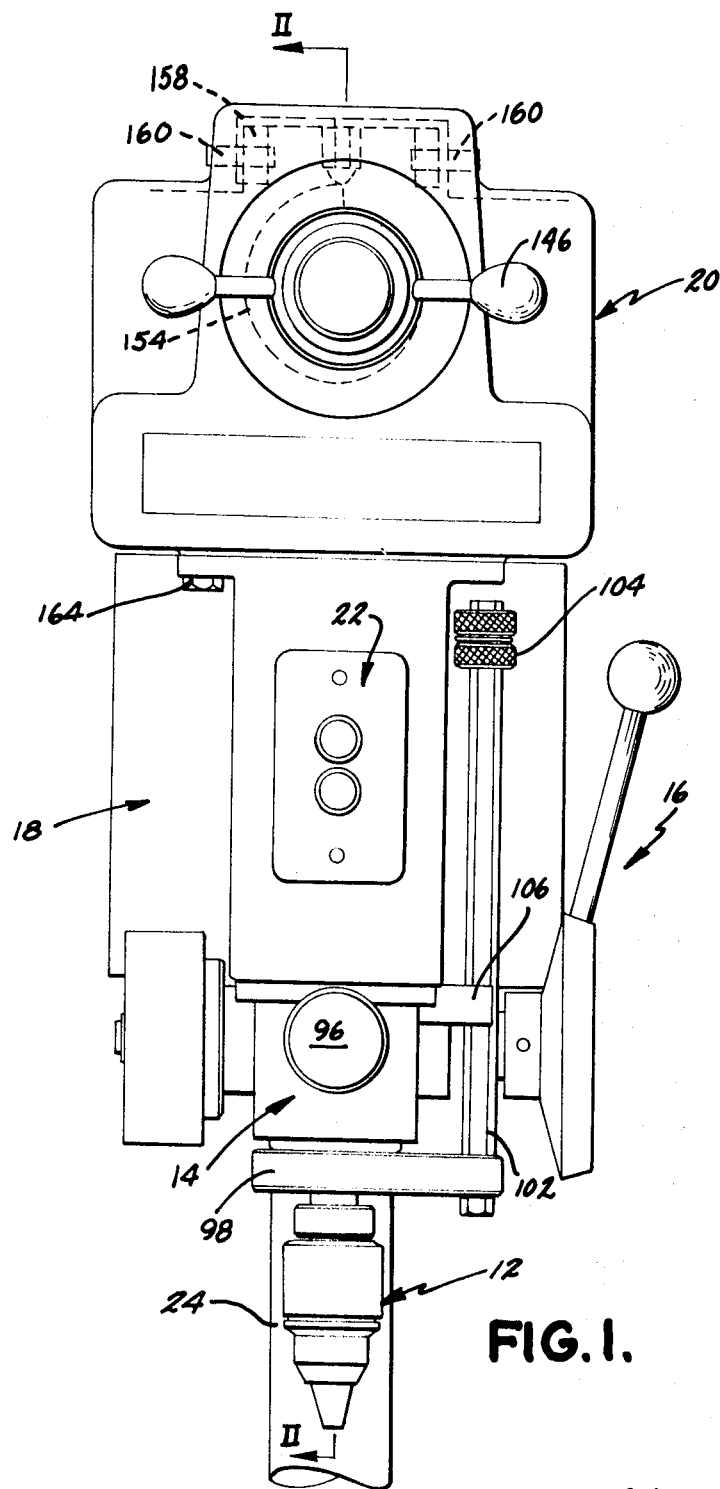
FIG. 1 is a front view of a drill press according to the invention.

Referring now to the drawings, a chuck 12 is supported by a drill assembly 14. A handle assembly 16 actuates movement of the chuck downwardly as the chuck rotates about a vertical axis. A main drill housing 18 supports the quill assembly and is in turn supported by a central support column 24. A control plate 22 is provided in the front face of the main drill housing to support controls for the power to the machine.

Positioned on the top of the main housing 18 is a speed adjustment mechanism generally designated by the numeral 20. A drive shaft 26 is fixed to the chuck 12 and in turn is connected to a connecting rod 28. The drive shaft 26 is rotatably supported within a quill 30 through a bearing assembly 32 at the top portion thereof and by a bearing assembly 34 at the bottom portion thereof.

The connecting rod 28 has a spline portion 36 which is longitudinally slidable within a spline engaging drive mechanism 48. The connecting rod 28 is supported for rotational and longitudinal movement in a bushing 38 which is supported by a flanged collar 126 through bearing assemblies 40 and 42. The bushing 38 is fixed to the spline engaging drive mechanism 48 through an annular cylinder 44 and key 45. Bolts 50 hold the annular cylinder 44 onto the spline engaging drive mechanism 48. A gear belt pulley wheel 52 is fixed onto the spline engaging drive mechanism 48. Power is supplied to the gear belt pulley wheel through a gear belt 54 which engages a gear belt pulley 56. Wheel member 58 supports gear belt pulley 56.

The gear belt 54 contains a plurality of teeth which engage indentations in the gear belt pulley wheels 52 and 56. In this manner, a positive drive is provided between gear belt pulley wheel 56 and gear belt pulley wheel 52. Therefore, there is no slippage between these two pulley wheels. A second wheel member 60 forms a pulley wheel with the wheel member 58. Power is supplied to the wheel members 58 and 60 through a drivebelt 62. Power is supplied to the drivebelt 62 from a motor (not shown) and a second pulley wheel (not shown). Wheel member 58 is fixed on counter shaft 64 which in turn is rotatably supported on a flanged collar 130 through bearings 66 and 68. The wheel member 60 engages the counter shaft 64 through a longitudinal spline but is longitudinally slidable on the counter shaft 64. Bearings 70 separate the rotating wheel member 60 from a fixed top plate 72.

QUILL ASSEMBLY

The quill assembly 14 comprises a quill-bearing housing 74 having a horizontal bore 76, a vertical bore 78, and a lateral threaded bore 80. The quill 30 reciprocates within the vertical bore. The quill assembly is fixed to the main drill housing 18 through a horizontal flange 81. The flange 81 has an upper flat machine surface 82 which abuts against a lower flat machined horizontal surface 122 of the drill housing. In this manner, precise alignment of the quill bearing housing 74 with respect to the main drill housing 18 is ensured.

Figure 2:
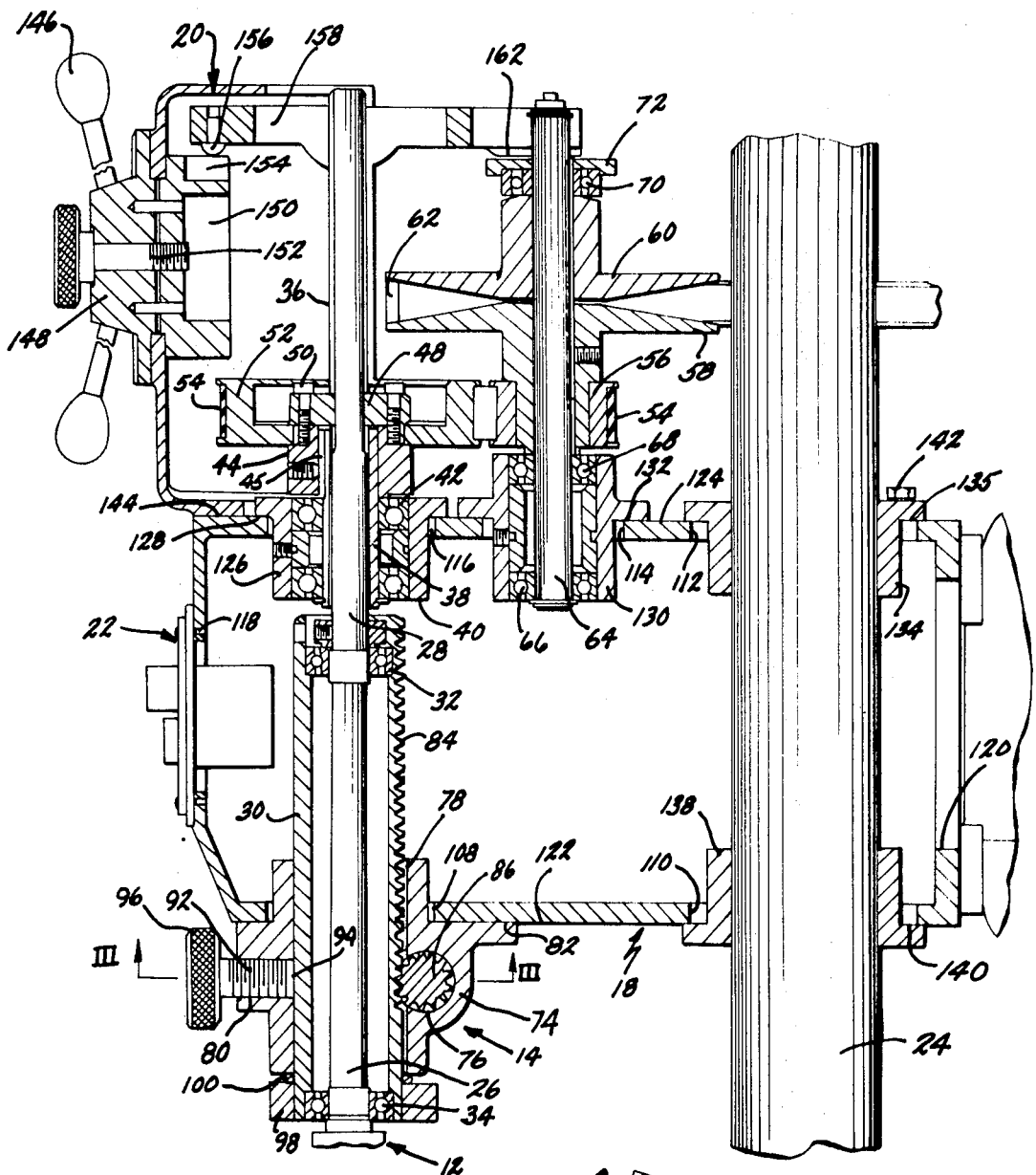
FIG. 2 is a side elevational view in section taken along lines II—II of FIG. 1.
Figure 3:
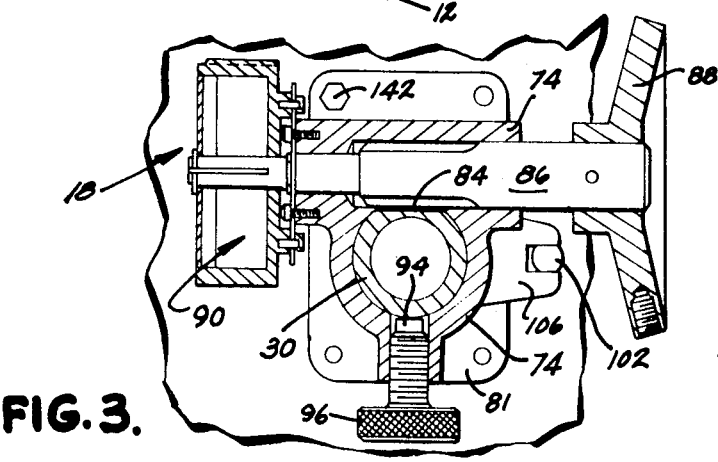
FIG. 3 is a sectional view taken along lines III—III of FIG. 2.

The quill 30 has a conventional rack 84 on one side thereof which engages a quill drive wheel 86. A handle hub 88 is fixed to the quill drive wheel 86 to facilitate rotation of the quill drive wheel 86 about a longitudinal axis. A spring assembly 90 is fixed to one end of the quill drive wheel 86 to rotatably bias the drive wheel 86 in a clockwise direction as seen in FIG. 2.

The quill can be maintained in a given position within the quill-bearing housing 74 by a threaded screw 92 having a bearing end 94 in contact with the quill 30. An adjustment knob 94 is provided on the end of the threaded screw to permit loosening or tightening of the pressure against the quill. The long bearing surface of the vertical bore 78 minimizes wear and prevents uneven wear between the quill 30 and the bore 78.

A flange 98 is fixed to the bottom of the quill 30. An O-ring 100 is fixed on the quill 30 between the bottom of the quill-bearing housing 74 and the flange 34. The O-ring therefore provides a stop for the quill to prevent the same from striking the quill-bearing housing 74 during the quill upward travel. The downward movement of the quill relative to the housing is limited by an adjustable nut 104 on stop rod 102 which is fixed to the flange 98. The adjustable nut 104 strikes a stop member 106 as the quill moves downwardly relative to the main housing. The stop member 106 is fixed to the quill-bearing housing 74.

MAIN DRILL HOUSING

The main drill housing 18 has openings 108 and 110 in the bottom wall, and openings 112, 114, and 116 in the top wall. An opening 120 is provided in the backwall. Opening 116 is spaced vertically above opening 108 and opening 112 is spaced vertically above opening 110. The main drill housing 18 has a lower flat machined surface 122 and an upper flat machined surface 124. These surfaces are parallel to each other and are horizontal in the final assembly.

Flanged collar 126 houses an upper extending flange with a flat machine bottom surface 128. The flat machined bottom surface 128 is perpendicular to the axis of the collar 126 and would therefore be perpendicular to the axis of connecting rod 28 and drive shaft 26. In this manner, precise alignment of the drive shaft relative to the main drill housing 18 can be easily established and maintained. The flat machined surface 82 of the quill-bearing housing 74 will not lie flatly against the lower flat machined surface 122 unless the quill housing 74 and the flanged collar 126 lie in a direct vertical line.

With this assembly, different quill housings can be substituted without fear of misaligning the drive shaft 26. Further, worn parts can be easily replaced without the necessity of replacing the entire main drill housing. If wear occurs, for example at the quill bearing housing 74, this housing can be replaced without fear of changing the alignment of the drive shaft 26.

The counter shaft 64 is supported through a flanged collar 130 having an outwardly extending flange with a flat machined bottom surface 132. This counter shaft 64 is also maintained in a precise vertical alignment relative to the flat machined surface 124 due to the fact that the flat machined bottom surface 132 is perpendicular to the axis of the collar 130 and to the axis of the counter shaft 64.

The central support column 24 supports the main drill housing 18 through flanged collars 134 and 138. Collar 134 has an outwardly extending flange with a lower flat machined surface 135 which is perpendicular to the axis of the collar 134 and therefore perpendicular to the axis of the central support column 24. Likewise, the flanged collar 138 has an outwardly extending flange with a flat machined top surface 140 which abuts against the flat machined lower surface 122 of the main drill housing 18. The flat surface 140 is perpendicular to the axis of the collar 138 and perpendicular to the axis of support column 24. The flat machined bottom surface 132 of flanged collar 130 abuts against the upper flat machined surface 124 of the main drill housing 18. By this arrangement of machined surfaces, positive and correct alignment of the support column with respect to the main drill housing 18 and with respect to the drive shaft 26 is ensured. In other words, if support column 24 is vertically fixed, then the surfaces 122 and 124 of the main drill housing 18 will be horizontal so long as the flat machined bottom surface 136 of flanged collar 134 and the flat machined top surface 140 of flanged collar 138 are flatly against the respective flat machined surfaces of the main drill housing 18. When this condition occurs, the flanges can be bolted to the drill housing through suitable means such as bolts 142.

VARIABLE SPEED CONTROL

The variable speed control 20 comprises a housing having a flat bottom surface 144 which abuts against the flat machined top surface 124 of the main drill housing 18. The speed control housing is bolted to the main drill housing 18 through suitable bolts such as 164 illustrated in FIG. 1.

A handle 146 is connected to a hub 148 which is fixed to cam wheel 150. A threaded holding rod 152 secures the cam wheel 150 to the hub 148. The cam wheel 150 has a cam surface 154 whose distance from the central axis of the cam wheel varies as illustrated by the dotted line in FIG. 1.

A cam follower 156 bears against the cam surface and is fixed to a pivot arm 158 pivotably supported by pivot pins 160 in the speed control housing. The pivot arm 158 has a bearing surface 162 which abuts against the top plates 72.

In operation, the space between the wheel members 58 and 60 determine the tension in the drivebelt 62. For example, as the wheel member 60 is permitted to move upwardly relative to wheel member 58, the drivebelt 62 can move closer to the central rotational axis, thereby decreasing the radius of the pulley wheel. This permits more slack in the drivebelt 62 and more slippage of the drivebelt 62 on the pulley wheels.

As the handle 146 rotates the cam wheel 150, the pivot arm 158 will be permitted to rotate in a counterclockwise direction as seen in FIG. 2, thereby raising bearing surface 162. This raising of the bearing surface 162 permits the wheel member 60 to be raised to permit more slippage of the drivebelt 62 on the wheel members 58 and 60.

The support column 24 is fixed to the casting by a conventional adjustable friction screw extending through the main housing 18 and contacting the support column 24. In other words, the friction screw threadably engages the drill press housing 18. When the screw is loosened, i.e., moved out of contact with the support column 24, then the main housing 18 is permitted to move upwardly or downwardly relative to the support column 24. When the screw is tightened against the support column 24, the housing is held fixed relative to the support column 24.

By the invention, the main housing 18 for the drill press can be cast out of a lightweight material such as aluminum or magnesium. The lightweight metal casting can be easily machined because of its soft nature. The flanged collars, on the other hand, can be made of a harder, more durable material. The collars can be machined and then hardened. This construction therefore provides the maximum degree of wear (on the harder flanged collars) and the ease of machining the large surfaces on the softer cast housing. When wear takes place on the flanged collars, they can be easily replaced with perfect alignment of the various parts.

It is seen that with the invention, the drive shaft can be maintained in a vertical line so long as the flanged collar machined surfaces are perpendicular to the axis of the collars and the flat machined surfaces of the main housing 18 are parallel.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. In a drill press having:
a main housing with a top wall, a bottom wall, and sidewalls;
a support column supporting said main housing;
a quill assembly supported by said main housing;
a drive shaft rotatably supported by said quill assembly for rotation about its longitudinal axis, said shaft adapted to engage a chuck at a bottom portion thereof;
means for supplying rotative power to said drive shaft;
said quill assembly having means for imparting longitudinal reciprocation to said drive shaft;
the improvement which comprises:
said main housing being hollow and having at a front portion thereof an opening in said bottom wall;
said main housing bottom wall having a machined, flat surface, at least adjacent said bottom wall opening;
a quill assembly having an outwardly extending flange member, a surface of said flange member being machined flat;
said quill assembly extending into said bottom wall opening with said flat surface of said quill assembly flange being in contact with said machined flat surface of said main housing, and said quill flange member being fixed to said housing, whereby precise alignment of said drive shaft and said quill assembly relative to said main housing are ensured;
an opening in said top wall vertically above said bottom wall opening;
a machined flat surface in said top wall, at least adjacent said top wall opening;
a flanged collar having a flat machined surface fixed in said top wall opening with said flat machined surface abutting said flat machined surface of said top wall;
said drive shaft extending through said top wall opening and through said flanged collar; and
means in said flanged collar supporting said drive shaft for rotation about a longitudinal axis and for longitudinal movement along said longitudinal axis, whereby precise alignment of said drive shaft relative to said main housing can be ensured.

2. A drill press according to claim 1 wherein said machined flat surfaces on said main housing bottom wall and top wall, on said quill flange members, and on said flanged collar are all parallel and perpendicular to the axis of said drive shaft.

3. A drill press according to claim 1 further comprising:
a second opening in said top wall main housing and a second opening in said bottom wall main housing at a back portion thereof, said second top wall opening being vertically aligned with said second bottom wall opening;
a second flat machined surface on said main housing top wall, at least adjacent said second top wall opening;
a second flanged collar fixed in said second top wall opening at said main housing back portion, said second flanged collar having an outwardly extending flange larger than said opening and abutting against said top wall;
a machined flat surface on said outwardly extending flange in contact with said second machined flat surface on said main housing top wall;
a second machined flat surface on said main housing bottom wall, at least adjacent said opening;
a third flanged collar fixed in said bottom wall opening at said main housing back portion, said third flanged collar having an outwardly extending flange larger than said opening and abutting against said bottom wall;
a machined flat surface on said outwardly extending flange of said third flanged collar in contact with said second machined flat upper surface on said main housing top wall;
said support column being mounted and extending through said first and second collars so that precise alignment of said support column relative to said main housing, said drive shaft, and said quill assembly can be assured.

4. The drill press of claim 3 in which the machined flat surfaces on said housing walls are located on the outer surfaces of said walls and said flanged collars are located on the said outer surfaces with the said flanges thereof abutting against said outer surfaces.

5. The drill press of claim 4 in which the machined flat surfaces on said main housing top wall are located on a first common plane; the machined flat surfaces on said main housing bottom wall are located on a second common plane parallel to said first common plane; and the openings are located on axes perpendicular to said planes.

6. A drill press according to claim 1 wherein said quill assembly has a housing with a vertical bore, a quill supported for reciprocatory motion within said vertical bore; and means to actuate reciprocatory motion of said quill within said vertical bore.

7. A drill press according to claim 6 wherein said quill contains a vertical rack; pinion means are provided in said housing to engage said rack through which vertical actuation of said quill within said quill housing can be effected.

8. In a drill press having:
a main housing with a top wall, a bottom wall, and sidewalls;
a support column supporting said main housing;
a quill assembly supported by said main housing;
a drive shaft rotatably supported by said quill assembly for rotation about its longitudinal axis, said shaft adapted to engage a chuck at a bottom portion thereof;
means for supplying rotative power to said drive shaft;
said quill assembly having means for imparting longitudinal reciprocation to said drive shaft;
the improvement which comprises:
said main housing being hollow and having at a front portion thereof an opening in said bottom wall;
said main housing bottom wall having a machined, flat surface, at least adjacent said bottom wall opening;
a quill assembly having an outwardly extending flange member, a surface of said flange member being machined flat;
said quill assembly extending into said bottom wall opening with said flat surface of said quill assembly flange being in contact with said machined flat surface of said main housing, and said quill flange member being fixed to said housing, whereby precise alignment of said drive shaft and said quill assembly relative to said main housing are ensured;
said rotative power supply means comprising a counter shaft; a variable drive speed control means imparting rotative motion to said counter shaft; a first gear belt pulley fixed to said variable drive shaft; a second gear belt pulley in rotatable engaging relationship with said drive shaft, and spaced laterally of said first gear belt pulley; and a gear belt in operative relationship with said first and second gear belt pulleys to provide positive nonslip drive of said drive shaft.

9. In a drill press having:
a main housing with a top wall, a bottom wall, and sidewalls;
a support column supporting said main housing;
a quill assembly supported by said main housing;
a drive shaft rotatably supported by said quill assembly for rotation about its longitudinal axis, said shaft adapted to engage a chuck at a bottom portion thereof;

means on said main housing for supplying rotative power to said drive shaft;

said quill assembly having means for imparting longitudinal reciprocation to said drive shaft;

the improvement which comprises:

an opening in said top wall main housing and an opening in said bottom wall main housing at a back portion thereof, said top wall opening being vertically aligned with said bottom wall opening;

a machined flat upper surface on said main housing top wall, at least adjacent said opening;

a first flanged collar fixed in said top wall opening at said main housing back portion, said flanged collar having an outwardly extending flange larger than said opening and abutting said top wall;

a machined flat surface on said outwardly extending flange in contact with said machined flat upper surface on said main housing top wall;

a machined flat surface on said main housing bottom wall, at least adjacent said opening;

a second flanged collar fixed in said bottom wall opening at said main housing stack portion, said flanged collar having an outwardly extending flange larger than said opening and abutting said bottom wall;

a machined flat surface on said outwardly extending flange in contact with said machined flat surface on said main housing bottom wall;

said support column being mounted in and extending through said first and second collars so that precise alignment of said support column relative to said main housing can be ensured.

10. In a support housing for a drill press, said housing having at least a bottom wall and a top wall, a first and second opening extending through said top wall; a third and fourth opening extending through said bottom wall; said first opening being vertically aligned with said third opening and said second opening being vertically aligned with said fourth opening; machined flat surfaces surrounding and immediately adjacent each of said openings; and flanged collar means fixed in each of said openings, each of said collars having an outwardly extending flange larger than said opening and a machined flat surface on said flange abutting said machined flat surfaces surrounding each of said respective openings in said collars are located.

11. A housing as defined in claim 10 in which the machined surfaces surrounding each of said openings are on the outer surfaces of said housing; and the machined surfaces surrounding the first and second openings are located on one plane and the surfaces surrounding the third and fourth openings are located on another plane parallel to said one plane.